(12) United States Patent
Kapaan et al.

(10) Patent No.: US 6,626,778 B1
(45) Date of Patent: Sep. 30, 2003

(54) CONTINUOUSLY VARIABLE TRANSMISSION UNIT

(75) Inventors: Hendrikus Jan Kapaan, Nieuwegein (NL); Johannes Albertus Van Winden, Heidelberg (DE); Eduardus Gerardus Maria Holweg, Delft (NL); Alexander Jan Carel Vries, Tiel (NL); Jacobus Zwarts, Nieuwegein (NL)

(73) Assignee: SKF Engineering and Research Centre B.V., Nieuwegein (NL)

(*) Notice: Subject to any disclaimer, the term of this patent is extended or adjusted under 35 U.S.C. 154(b) by 0 days.

(21) Appl. No.: 09/890,605

(22) PCT Filed: Feb. 11, 2000

(86) PCT No.: PCT/NL00/00085

§ 371 (c)(1),
(2), (4) Date: Aug. 23, 2001

(87) PCT Pub. No.: WO00/49313

PCT Pub. Date: Aug. 24, 2000

(30) Foreign Application Priority Data

Feb. 17, 1999 (NL) .............................................. 1011319

(51) Int. Cl.⁷ .................. F16H 59/00; F16H 63/04; F16H 61/02
(52) U.S. Cl. ............... 474/20; 474/41; 474/39
(58) Field of Search .............. 474/20, 8, 19, 474/25, 41, 43, 49, 42

(56) References Cited

U.S. PATENT DOCUMENTS

| 2,054,564 A | * | 9/1936 | Quiroz .................... 474/20 |
| 2,200,101 A | * | 5/1940 | Schmitter ................ 474/25 |
| 2,639,621 A | * | 5/1953 | Harris et al. ............ 474/41 |
| 3,434,641 A | * | 3/1969 | Ambros .................... 474/20 |
| 4,557,705 A | | 12/1985 | Shimizu |
| 4,913,685 A | * | 4/1990 | Lukatsch ................. 474/49 |

FOREIGN PATENT DOCUMENTS

| DE | 188 920 C | | 9/1907 | |
| EP | 0 582 307 A1 | | 2/1994 | |
| JP | 57-97948 A | * | 6/1982 | .................. 474/20 |
| SU | 001732085 A | * | 5/1992 | .................. 474/20 |

\* cited by examiner

Primary Examiner—Marcus Charles
(74) Attorney, Agent, or Firm—Oliff & Berridge, PLC

(57) ABSTRACT

A continuously variable transmission unit comprises two pulley sets (1, 2) which each comprises a pair of discs (66, 67) and a screw mechanism (12, 13) which is concentrated with respect to a pulley set (1, 2) for moving the discs (66, 67) of the pulley set (1, 2) towards and from each other, each pair of discs (66, 67) enclosing a V-shaped groove, a belt (5) stretching between the pulleys and accommodated in the grooves thereof, the screw mechanism (12, 13) being controllable by a control device, the discs (66, 67) of each pulley set (1, 2) being accommodated on a support shaft (68). The screw mechanism (12, 13) is accommodated in the bore in the shaft (68) and engaging at least on of the discs (66, 67).

23 Claims, 5 Drawing Sheets

CONTINUOUSLY VARIABLE TRANSMISSION UNIT

The invention is related to continuously variable transmission unit, having two pulley sets which each comprise a pair of discs, a support shaft and a screw mechanism, each screw mechanism being concentric with respect to the respective support shaft for moving the discs of the respective pulley set towards and from each other, each pair of discs enclosing a V-shaped groove, an endless flexible element stretching between the pulley sets and accommodated in the grooves thereof, the screw mechanism being controllable by a control means.

Such continuously variable transmission unit is disclosed in EP-A-582307. The prior art continuously variable transmission unit has the disadvantage that its overall dimensions are large, which is undesirable in particular in the automotive field.

SUMMARY OF THE INVENTION

The object of the invention is to provide a continuously variable transmission unit which does not have this disadvantage. The object is achieved in that each screw mechanism is accommodated in a bore in the corresponding support shaft. The screw mechanism engages at least one of the discs through at least one longitudinal aperture extending from the bore towards the outer circumference of the support shaft.

By positioning the screw mechanism concentric inside the shaft, the overall dimensions of the unit are reduced. Moreover, the adjusting clamping force exerted by the screw mechanism is also central with respect to the discs, which provides a direct drive without play. Thereby, the displacements of the discs can be controlled in a well-defined way, which enhances the accuracy of the transmission ratio.

According to a preferred embodimnent, at least one of the pulleys has a screw mechanism comprising two screw actuators which have mutually opposite screw thread angles, each screw actuator engaging a respective disc. The discs of the pulleys can then be displaced symmetrically. As a result, no transverse displacements are imposed on the belt. Thus, the belt is loaded symmetrically with respect to the plane of symmetry of the pulley sets, leading to a longer service life of the transmission.

Moreover, as a result of the circumstance that both discs can be moved, the total displacement of each disc is only half the distance over which the movable disc is to be displaced in case the other disc is fixed, as according to EP-A-582307. Thus, relatively rapid changes in transmission ratio are possible, without the displacement speed of the discs becoming too high.

Additionally the advantage is obtained that the components of each pulley set can be identical which reduces the cost.

Reference is made to the continuously variable transmission unit as disclosed in SU-A-732085. The unit has pulleys, the discs of which each engage a central shaft by means of a screw mechanism having threads with opposite pitch. By means of springs, the discs of each pulley are constantly urged towards each other. A relative displacement of the sheaves is obtained as a result of increased loadings on the belt.

The unit lacks a drive mechanism, nor does the screw mechanism constitute an actuator for actively influencing the relative position of the discs.

Preferably, each disc of the at least one pulley is slidably but non-rotatably accommodated on the support shaft, the screw actuators engaging opposite ends of the support shaft. Each screw actuator engages the support shaft by means of a four-point angular contact ball bearing with different load angles.

Each screw actuator engages the support shaft by means of a support bearing. The bearings may be carried out as four-point angular contact ball bearings, preferably of asymmetric design. For reasons of a higher load bearing capacity and compactness, a full complement bearing may be used.

The outer ring of at least one support bearing is integrated with the shaft.

Each screw actuator comprises a nut and a screw, the nuts each engaging a disc, the screws engaging the support shaft.

The screw actuator may be either of a ball screw or of a roller screw type. In the latter case, the radial dimensions of the screw actuator are relatively small, resulting in reduced overall dimensions of the complete unit.

The nuts of the screw actuators can be accommodated on a common drive shaft extending through the support shaft.

The support shaft is supported by means of support bearings with respect to a housing, the nut of each screw actuator having at least one radial extension engaging the corresponding disc. In that case, the support shaft has at least one slot through which an extension extends.

The support shaft at one end is connected to an input shaft or an output shaft, and at the other end to a drive mechanism for controlling the transmission ratio.

BRIEF DESCRIPTION OF THE DRAWINGS

The invention will now be described further with reference to the embodiments shown in the figures.

Figure 1A:
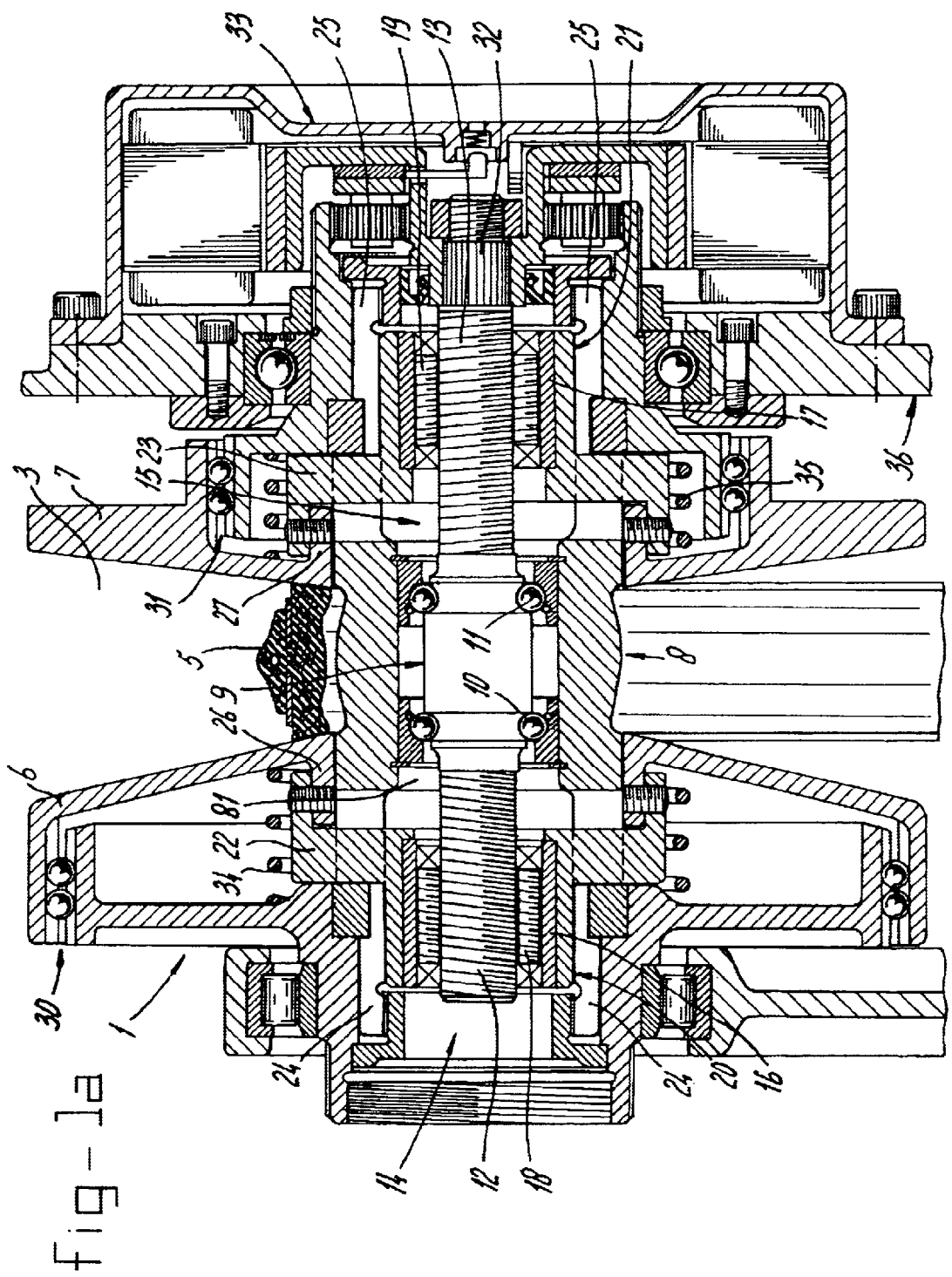
FIGS. 1*a* and 1*b* show a first embodiment of the continuously variable transmission unit according to the invention.

The continuously variable transmission unit according to the invention comprises two pulley sets 1, 2, each having a V-shaped groove 3, 4 accommodating a belt 5.

Each pulley 1, 2 comprises two discs 6, 7, which are slidably towards and from each other, accommodated on a support shaft 8.

Support shaft 8 has a bore 81, within which a concentric drive shaft 9 is supported by means of angular contact ball bearings 10, 11. The drive shaft 9 comprises two screws 12, 13 of the screw actuators 14, 15. The screw actuators 14, 15 moreover each comprise a nut 16, 17, engaging the screws 12, 13 by means of a set of groove rollers 18, 19.

Each nut engages a drive sleeve 20, 21, which drive sleeves 20, 21 each have radial extensions 22, 23.

The radial extensions 22, 23 extend through the slots or grooves 24, 25 in the opposite radial ends of the drive shaft 9. The outer ends of the radial extensions 22, 23 are each connected to a sliding ring 26, 27 of a respective disc 6, 7, which rings 26, 27 slide over the external circumference of the support shaft 8.

By means of ball groove connections 30, 31, the discs 6, 7 are slidably, but non-rotatably fixed on the support shaft 8.

The control shaft 9 furthermore has a splined end 32, which engages the drive mechanism 33. By means of this drive mechanism 33, the screws 18, 19 can be rotated with respect to the nuts 16, 17, so as to obtain the desired mutual displacements of discs 6, 7, and thereby the desired transmission ratio.

The discs 6, 7 of pulley 2 are constantly urged towards each other by means of springs 34, 35.

The drive shaft 9 furthermore has a splined end 32, which engages the drive mechanism 33. By means of this drive mechanism 33, the screws 18, 19 can be rotated with respect to the nuts 16, 17, so as to obtain the desired mutual displacements of discs 6, 7 and thereby the desired transmission ratio.

The drive mechanism 33 comprises a motor 36, which has a stator 37 and a rotor 38. By means of an electromagnetic clutch plate 39, which is energised via collector ring 14, the rotor 38, in particular the armature 41 thereof, can be connected or disconnected from reduction gear mechanism 41 which in turn engages the drive shaft 9.

In steady state operation, that is with constant transmission ratio, relative rotations between support shaft 8 and drive shaft 9 are inhibited by the engaged clutch plate 39. In case the transmission ratio should be changed, the clutch plate 39 is disengaged, and a desired rotation can be imposed on the drive shaft 9 so as to activate the screw actuators 14, 15. A sensor 72 is provided for sensing a parameter associated with the rotational movement of the support shaft 8. Also, a sensor 73 is provided for sensing a parameter associated with the rotational movement of the drive shaft 9.

In steady state operation, that is with constant transmission ratio, relative rotations between support shaft 8 and drive shaft 9 are inhibited by the engaged clutch plate 39. In case the transmission ratio should be changed, the clutch plate 39 is disengaged, and a desired rotation can be imposed on the drive shaft 9 so as to activate the screw actuators 14, 15.

Figure 2:
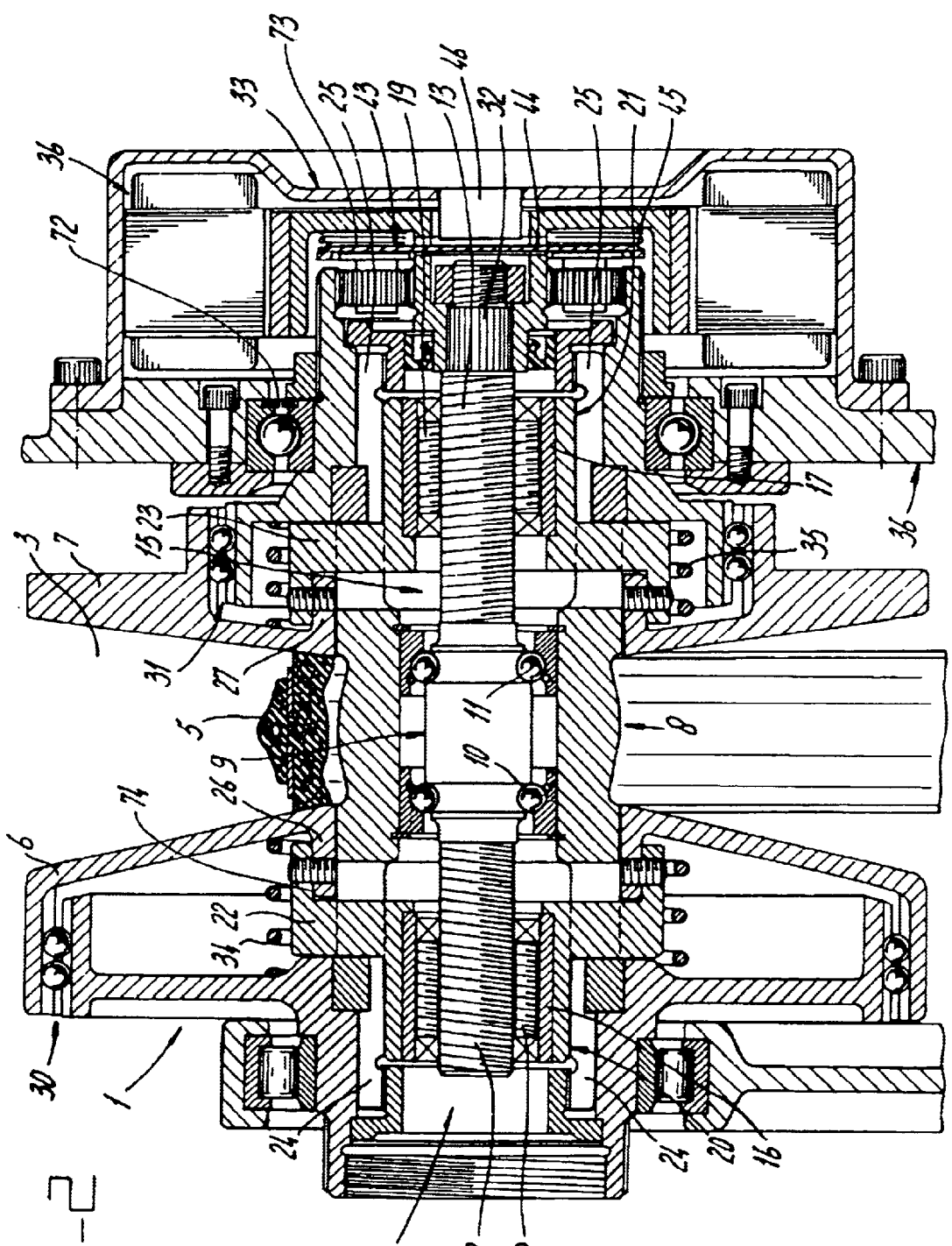
FIG. 2 shows a second embodiment of the continuously variable transmission unit according to the invention.

The embodiment of FIG. 2 shows a clutch mechanism 43, having a clutch plate 44 which by means of spring 45 is constantly urged in the engaged position. In that position, no relative rotation is possible between support shaft 8 and drive shaft 9.

Upon actuating the electromagnet 46, the clutch plate 44 is released, such that a desired rotation may be imposed on the drive shaft 9 through the motor 36.

Figure 3:
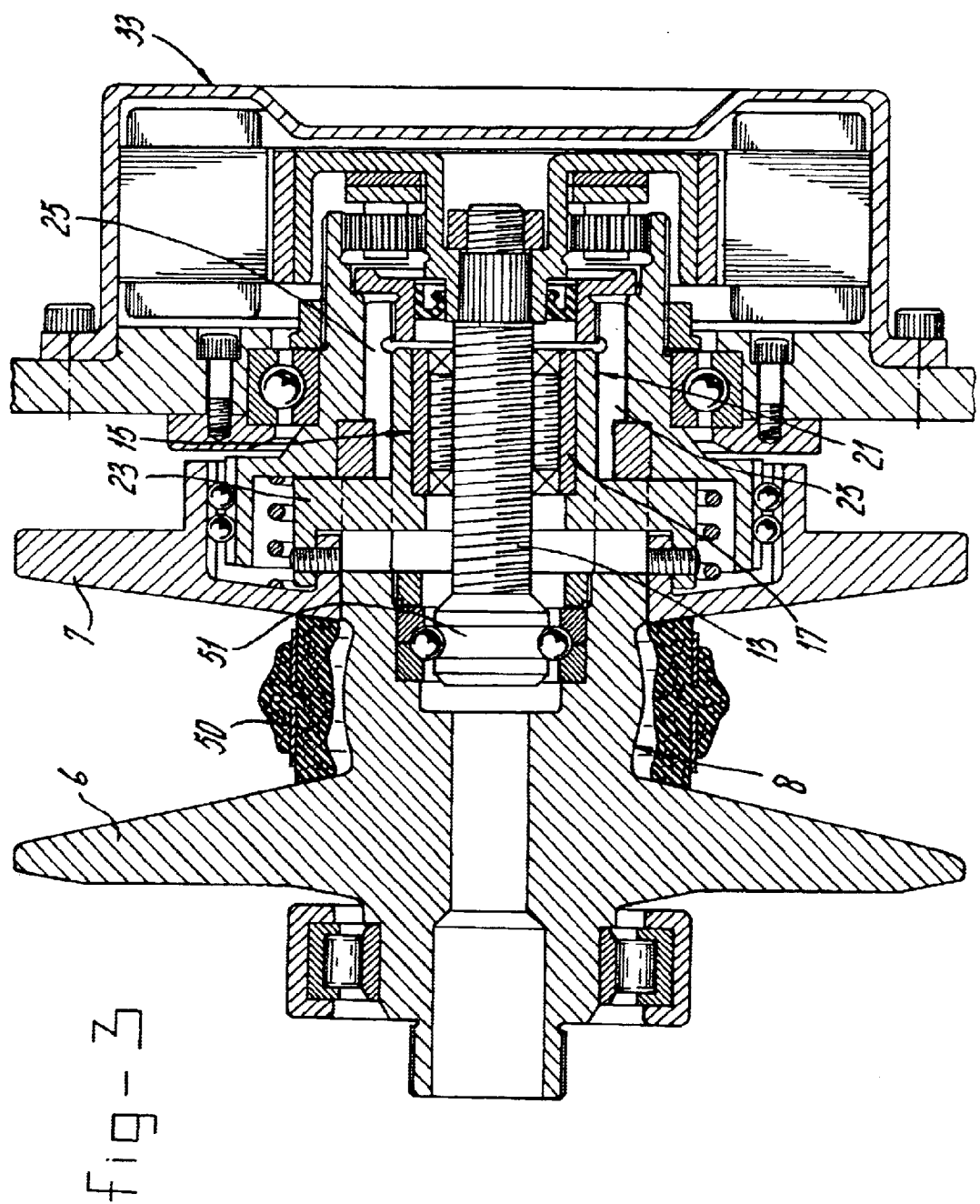
FIG. 3 shows a third embodiment of the continuously variable transmission unit according to the invention.

The embodiment of FIG. 3 comprises a pulley set wherein one of the discs 6 is fixed with respect to the support shaft 8, and the other disc 7 is actually displaceable with respect to the support shaft 8. Further, at,least one of the pulley set includes a load sensor 74.

This pulley set comprises one single screw actuator 15, which by means of angular contact ball bearing 50 engages the shaft 8. The angular contact ball bearing 50 comprises an inner race 51 which is integrated with the screw 13 of the screw actuator 15. The nut 17 of this screw actuator 15 is connected to the drive sleeve 21, radial extensions 23 of which extend through grooves 25 of the support shaft 8. By rotating the screw 13, the nut 17, and thereby the drive sleeve 21 and radial extensions 23, connected to the displaceable disc 7, are moved in unison.

Figure 1B:
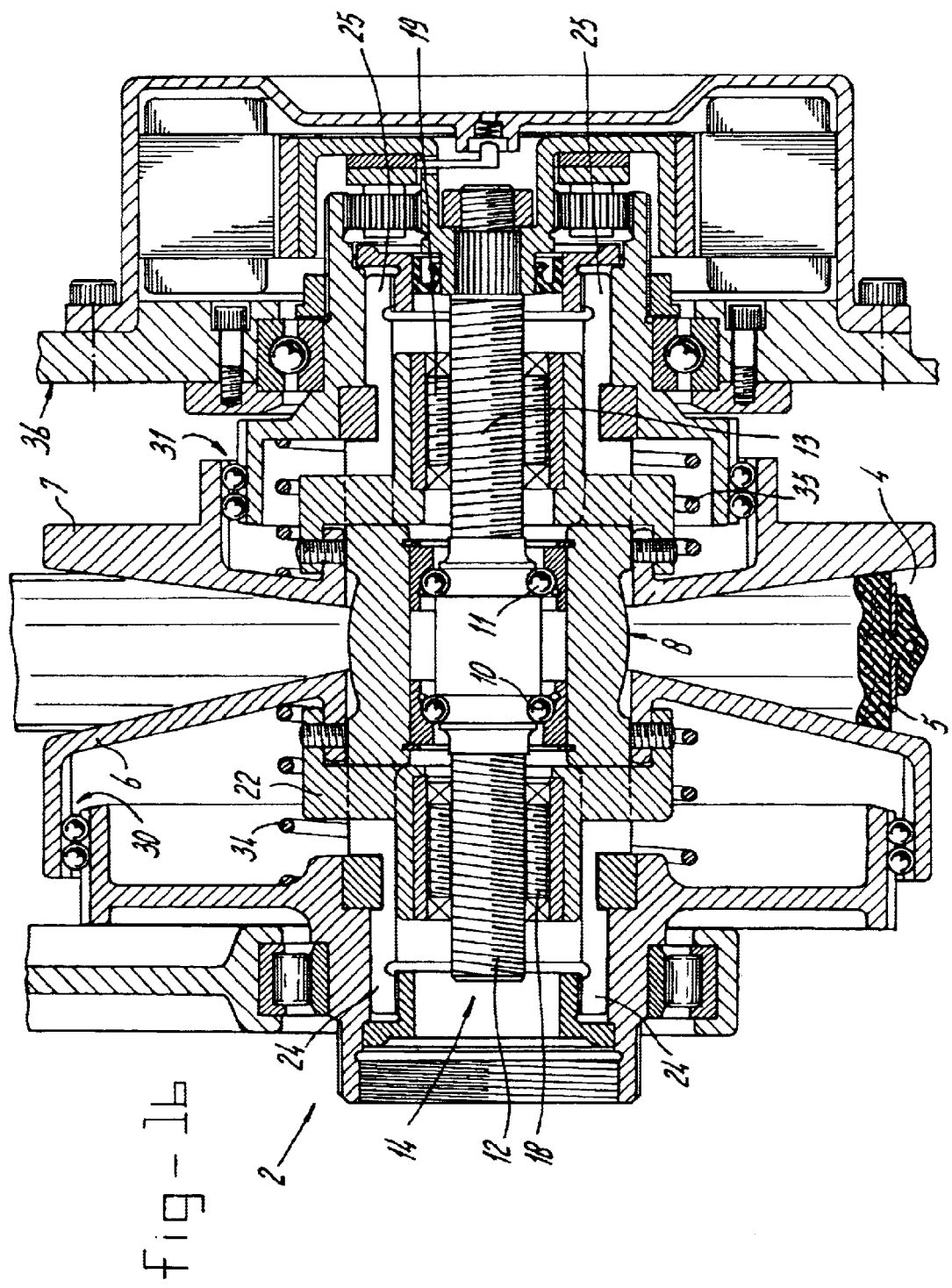

The control of the screw actuator 15 is controlled by a drive mechanism 33, in FIG. 3 which is identical to the drive mechanism 33 as contained in the embodiment of FIG. 1a and FIG. 1b.

Figure 4:
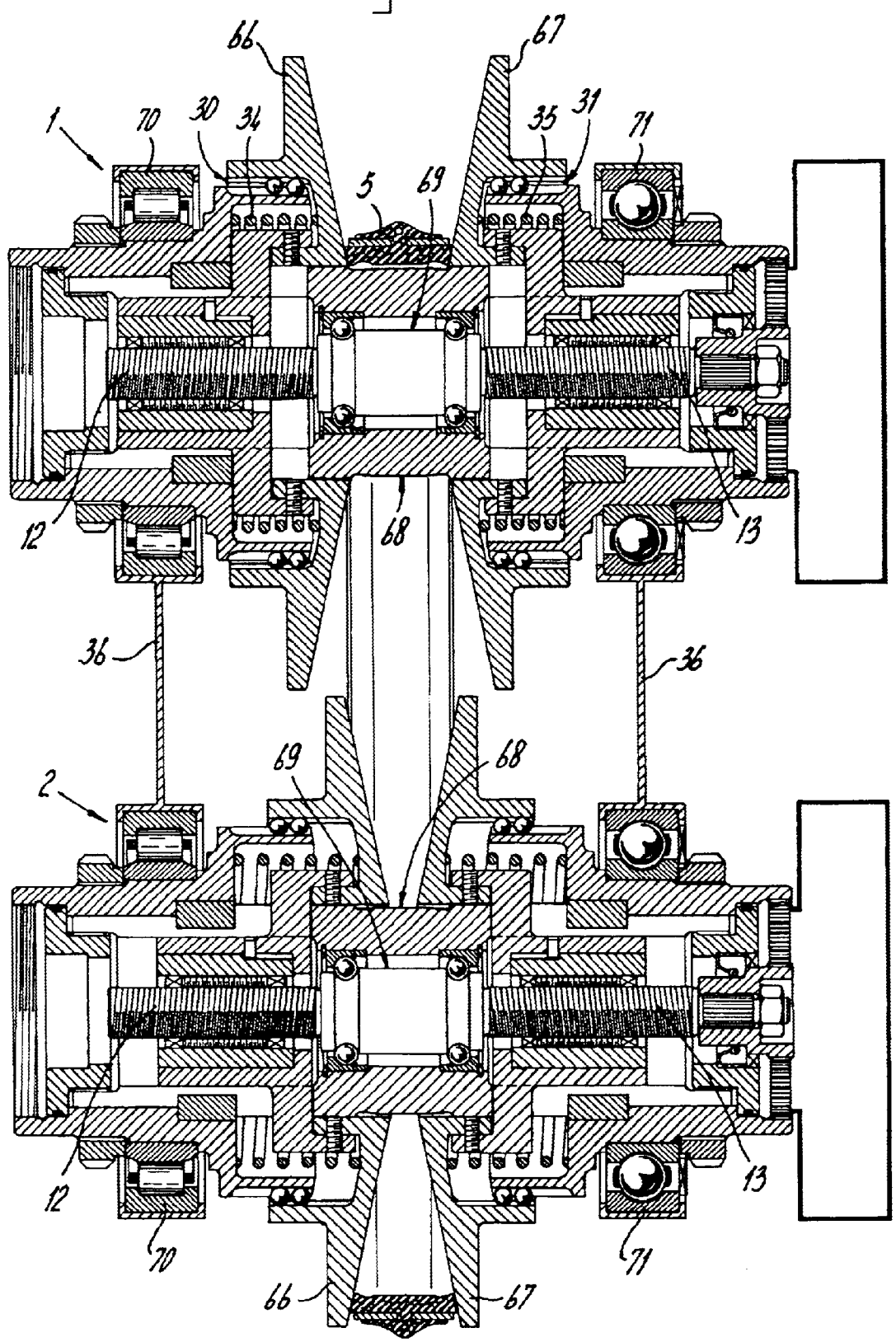
FIG. 4 shows a fourth embodiment of the continuously variable transmission unit according to the invention.

The embodiment of FIG. 4 comprises pulley sets 1, 2, which each have identical discs 66, 67. Thus, each disc 66, 67 is disposed symmetrically with respect to the belt 5.

Advantageously, the manufacturing and warehousing costs can be decreased, as only one type of disc 66, 67 is needed.

The pulley sets 1, 2 are each connected to frame members 36, through bearings 70, 71. Thus, the pulley sets 1, 2 together with frame members 36 form a unit, which can be directly applied in e.g. a housing.

What is claimed is:

1. A continuously variable transmission unit, comprising:
   two pulley sets which each including a pair of discs, each pair of discs enclosing a V-shaped groove;
   a support shaft;
   two screw mechanism, each screw mechanism being concentric with respect to the support shaft for moving the discs of the respective pulley set towards and from each other; and
   an endless flexible element stretching between the pulley sets and accommodating in the V-shaped groove thereof,
   wherein each screw mechanism being controllable by a control means and having two screw actuators with opposite screw thread angles, each screw actuator-engaging the respective discs and having a screw and a nut such that the screw and the nut of each screw mechanism are accommodated in a bore in the support shaft, and each screw actuator engaging the support shaft by means of a support bearing, accommodated in the bore of the support shaft.

2. The continuously variable transmission unit according to claim 1, wherein the screw mechanism engages the at least one of the discs through one or more longitudinal apertures extending from the bore towards an outer circumference of the support shaft.

3. The continuously variable transmission unit according to claim 1, wherein at least one of the screw actuator is a roller screw actuator.

4. The continuously variable transmission unit according to claim 1, wherein at least one of the screw actuator is a ball screw actuator.

5. The continuously variable transmission unit according claim 1, wherein the nuts of the screw actuators are accommodated on a common drive shaft extending through the support shaft.

6. The continuously variable transmission unit according claim 1, wherein the support shaft is supported by the means of the support bearings with respect to a housing, the nut of each screw actuator having at least one radial extension engaging the corresponding disc.

7. The continuously variable transmission unit according claim 1, wherein the support shaft has at least one slot through which an extension extends.

8. The continuously variable transmission unit according to claim 1, wherein a sensor is provided for sensing a parameter associated with a rotational movement of the support shaft.

9. The continuously variable transmission unit according to claim 1, wherein a sensor is provided for sensing a parameter associated with a rotational movement of the drive shaft.

10. The continuously variable transmission unit according to claim 1, wherein the pulley sets are mutually connected by frame members.

11. The continuously variable transmission unit according to claim 1, wherein the discs of each one of the pulley set are identical.

12. The continuously variable transmission unit according to claim 1, wherein at least one of the pulleys comprises a load sensor.

13. The continuously variable transmission unit according to claim 1, wherein the screw actuators have mutually opposite screw thread angles, each screw actuator engaging the respective disc.

14. The continuously variable transmission unit according to claim 13, wherein the nuts engages at least one of the discs and at least one of the screws engages the support shaft.

15. The continuously variable transmission unit according to claim 13, wherein each the discs of the at least of the one pulley set is slidably but non-rotatably accommodated on the support shaft, the screw actuators engaging opposite ends of the support shaft.

16. The continuously variable transmission unit according to claim 15, wherein at least one of the support bearing is a 4-point angular contact ball bearing.

17. The continuously variable transmission unit according to claim 15, wherein at least one of the support bearing is an asymmetric angular contact ball bearing.

18. The continuously variable transmission unit according to claim 15, wherein at least one of the support bearing is a full complement bearing.

19. The continuously variable transmission unit according to claim 15, wherein an outer ring of at least one of the support bearing is integrated with the shaft.

20. The continuously variable transmission unit according to claim 13, wherein the support shaft at one end is connected to a drive or driven shaft, and at the other end to a control mechanism for controlling the differential speed between the support shaft and the drive shaft.

21. The continuously variable transmission unit according to claim 20, wherein the control mechanism comprises an electrical, an electronic, a hydraulic device or a combination of these.

22. The continuously variable transmission unit according to claim 1, wherein the flexible element is a belt, the belt being a flexible metallic belt, a non-metallic belt or a combination.

23. The continuously variable transmission unit according to claim 22, wherein the flexible element is a chain.

* * * * *